US012805587B2

(12) United States Patent
Karuppasamy

(10) Patent No.: US 12,805,587 B2
(45) Date of Patent: Nov. 24, 2026

(54) FLEXIBLE TENTED NOSE COVER

(71) Applicant: Karunakaravel Karuppasamy, Westlake, OH (US)

(72) Inventor: Karunakaravel Karuppasamy, Westlake, OH (US)

( * ) Notice: Subject to any disclaimer, the term of this patent is extended or adjusted under 35 U.S.C. 154(b) by 832 days.

(21) Appl. No.: 18/122,615

(22) Filed: Mar. 16, 2023

(65) Prior Publication Data

US 2023/0337764 A1 Oct. 26, 2023

Related U.S. Application Data

(60) Provisional application No. 63/320,343, filed on Mar. 16, 2022.

(51) Int. Cl.

*A41D 13/11* (2006.01)
*A62B 23/02* (2006.01)
*A62B 23/06* (2006.01)

(52) U.S. Cl.

CPC ........ *A41D 13/1115* (2013.01); *A41D 13/113* (2013.01); *A62B 23/025* (2013.01); *A62B 23/06* (2013.01)

(58) Field of Classification Search

CPC . A41D 13/113; A41D 13/1115; A62B 23/025; A62B 23/06; A61F 13/08

See application file for complete search history.

(56) References Cited

U.S. PATENT DOCUMENTS 1,122,841 A 12/1914 Allen
4,319,567 A 3/1982 Magidson
4,417,575 A * 11/1983 Hilton ................ A41D 13/1115 128/206.16
5,357,947 A 10/1994 Adler
6,394,090 B1 * 5/2002 Chen .................... A41D 13/113 128/206.16
8,733,357 B2 5/2014 Sullivan, Jr.
9,247,775 B2 2/2016 Suzuki et al.
9,463,340 B1 * 10/2016 Epstein .................. A41D 13/11
10,602,785 B2 3/2020 Duffy
11,122,841 B2 * 9/2021 Tsuei ................... A41D 13/113
2005/0161046 A1 * 7/2005 Michaels ............... A62B 23/06 128/206.14
2011/0155138 A1 * 6/2011 Lin .................... A41D 13/1115 128/206.19
2012/0000473 A1 * 1/2012 Shigematsu ......... A41D 13/113 128/206.19
2012/0272967 A1 * 11/2012 Stewart .............. A41D 13/1192 128/206.12
2020/0376305 A1 * 12/2020 Lang ........................ A62B 9/02
2021/0060364 A1 3/2021 Liu et al.
2021/0360998 A1 11/2021 Kapila

FOREIGN PATENT DOCUMENTS

WO WO-2021078415 A1 * 4/2021 ......... A41D 13/1107
WO 2021212830 10/2021

* cited by examiner

*Primary Examiner* — Bradley H Philips

(74) *Attorney, Agent, or Firm* — Tarolli, Sundheim, Covell & Tummino LLP

(57) ABSTRACT

A mask is provided that conforms to the convolutions in and around the nose and check, that can dynamically expand during facial movements, and that can reduce air leakage around the nose.

14 Claims, 19 Drawing Sheets

FLEXIBLE TENTED NOSE COVER

CROSS-REFERENCE TO RELATED APPLICATIONS

The present application claims priority to U.S. Provisional Application No. 63/320,343 filed on Mar. 16, 2022, which is incorporated by reference in its entirety.

TECHNICAL FIELD

The present invention relates to face masks or nose covers.

BACKGROUND

The most common site for air leak while wearing a mask is in and around the nose. This reduces filtration of pathogens (while breathing in) and also causes fogging of eye protectors (while breathing out). Further, during facial movements, masks can move and slide sometimes gets displaced due to jaw/chin movements. Because the contours, size etc. of patients' face differ, these convolutions in and around the nose and cheek allows gaps to appear between the top edge of a mask and the skin and let air to leak easily.

Facial movements are dynamic and necessary. Some masks are made more rigid and this can uncomfortably restrict facial movements. Some masks are do not dynamically expand with movements. As a result, these masks can slip and require frequent handlings and adjustments.

SUMMARY

The present invention provides a mask that conforms to the convolutions in and around the nose and check, that can dynamically expand during facial movements, and that can reduce air leakage around the nose.

DETAILED DESCRIPTION

Figure 1:
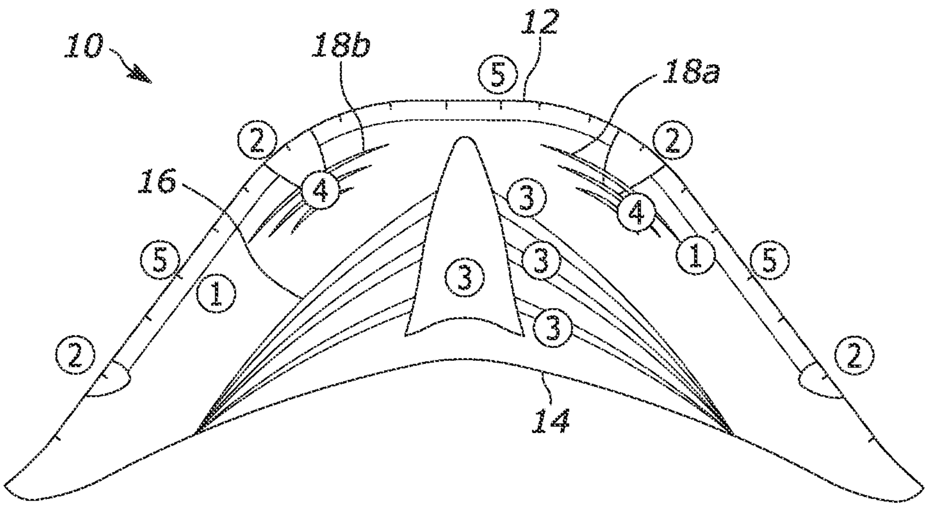
FIG. 1 is an internal view of a facial cover according to an aspect of the present disclosure.

As used herein with respect to a described element, the terms "a," "an," and "the" include at least one or more of the described element(s) including combinations thereof unless otherwise indicated. Further, the terms "or" and "and" refer to "and/or" and combinations thereof unless otherwise indicated. By "substantially" is meant that the distance, shape, or configuration of the described element need not have the mathematically exact described distance, shape, or configuration of the described element but can have a distance, shape, or configuration that is recognizable by one skilled in the art as generally or approximately having the described distance, shape, or configuration of the described element. As such "substantially" refers to the complete or nearly complete extent of a characteristic, property, state, or structure. The exact allowable degree of deviation from the characteristic, property, state, or structure will be so as to have the same overall result as if the absolute characteristic, property, state, or structure were obtained "connected to," "operably connected to," "coupled to," "operably coupled to," "disposed adjacent to," "disposed between," "disposed on," "between," "located at" another component can have intervening components between the components so long as the device can perform the stated purpose. The terms "top," "bottom," "side" "left," and "right" refer to the orientation of the devices as depicted in the drawings. The sequence of operations (or steps) is not limited to the order presented in the claims or figures unless specifically indicated otherwise.

As used herein a "patient" includes a mammal such as a human being. Although the drawings show certain elements of a device in combination, it should be noted that such elements can be included (or excluded) in the depicted embodiment and in other embodiments or aspects illustrated in other drawings. In other words, each of the disclosed aspects and embodiments of the present disclosure may be considered individually or in combination with other aspects and embodiments of the disclosure. All devices and components as described herein are used for medical purposes and are therefore sterile.

Figure 2:
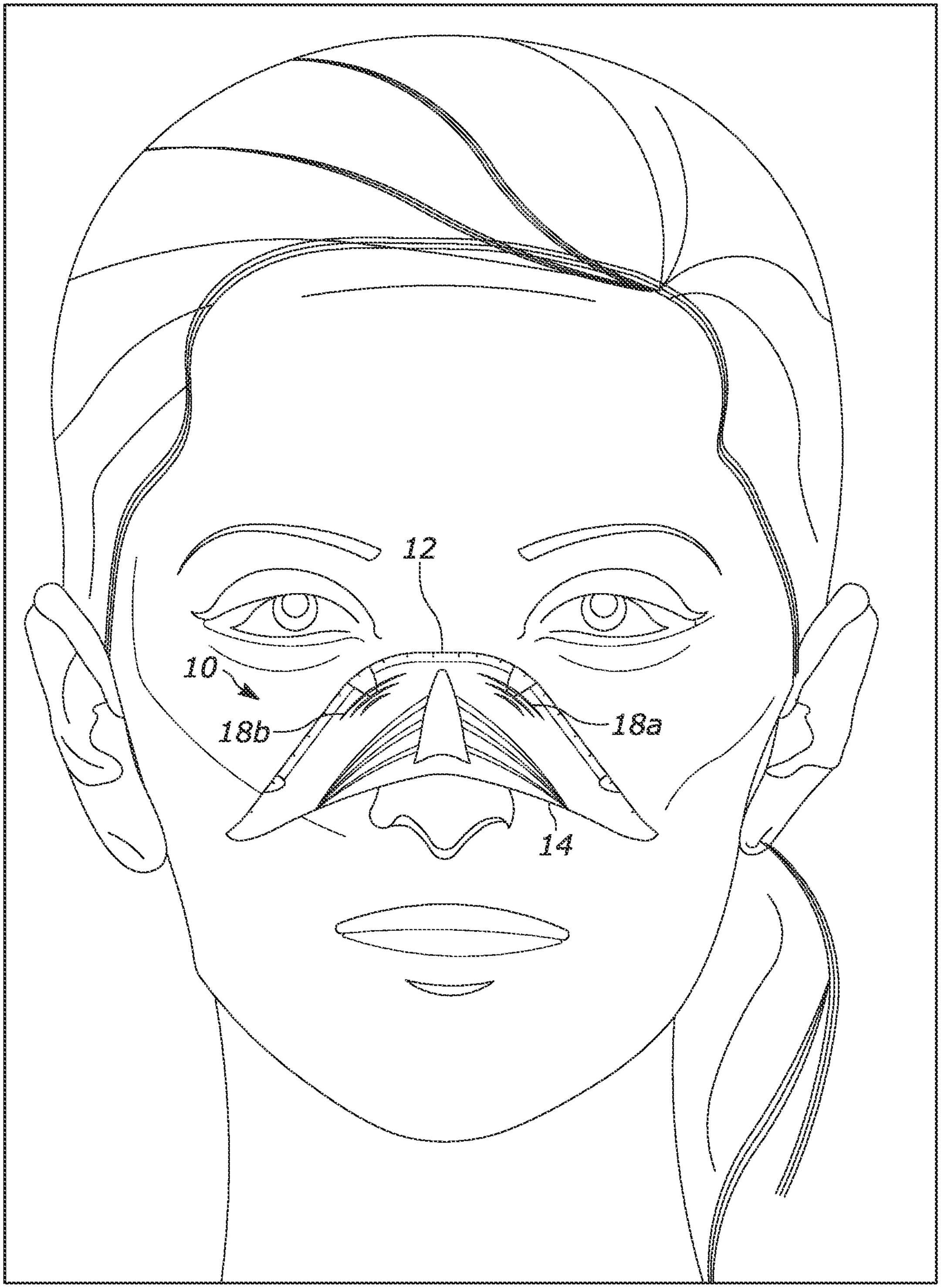
FIG. 2 is a schematic front view of the facial cover of FIG. 1 donned by a wearer.

Referring to FIGS. 1 and 2, in an aspect, a flexible tented facial cover 10 is provided having a top portion 12 and a bottom portion 14. Cover 10 can comprise base layer 16 having a thickness. The base layer can be fabricated, for example, from a material that is either impermeable or selectively semi-impermeable that filters tiny particles (e.g. polyethylene). A periphery 1 at top portion 12 can comprise a plurality of hinged segments (described in detail below) configured to permit deformation of the top portion of the cover while the periphery stays in substantial contact with the wearer's skin. The cover can include a plurality of sections 2 at an outer edge of the top portion, each having a thickness less than the thickness of base layer 16. Such sections can allow the cover to substantially conform to the contour around the nose and the cheek of a wearer. A plurality of cover tents 3 can be configured to be disposed on the nose and parts of the cheek adjacent to the nose thereby allowing the facial cover to expand side to side and top to bottom. A plurality of air reflectors 4 can be disposed on respective cheek portion 18*a* and 18*b* of the cover and can be configured to minimize air leakage around the nose. In certain aspects, the facial cover can further comprise a plurality of slits 5 located at the outer edge of the top portion. Such slits can allow widening of the cover during use.

Figure 3:
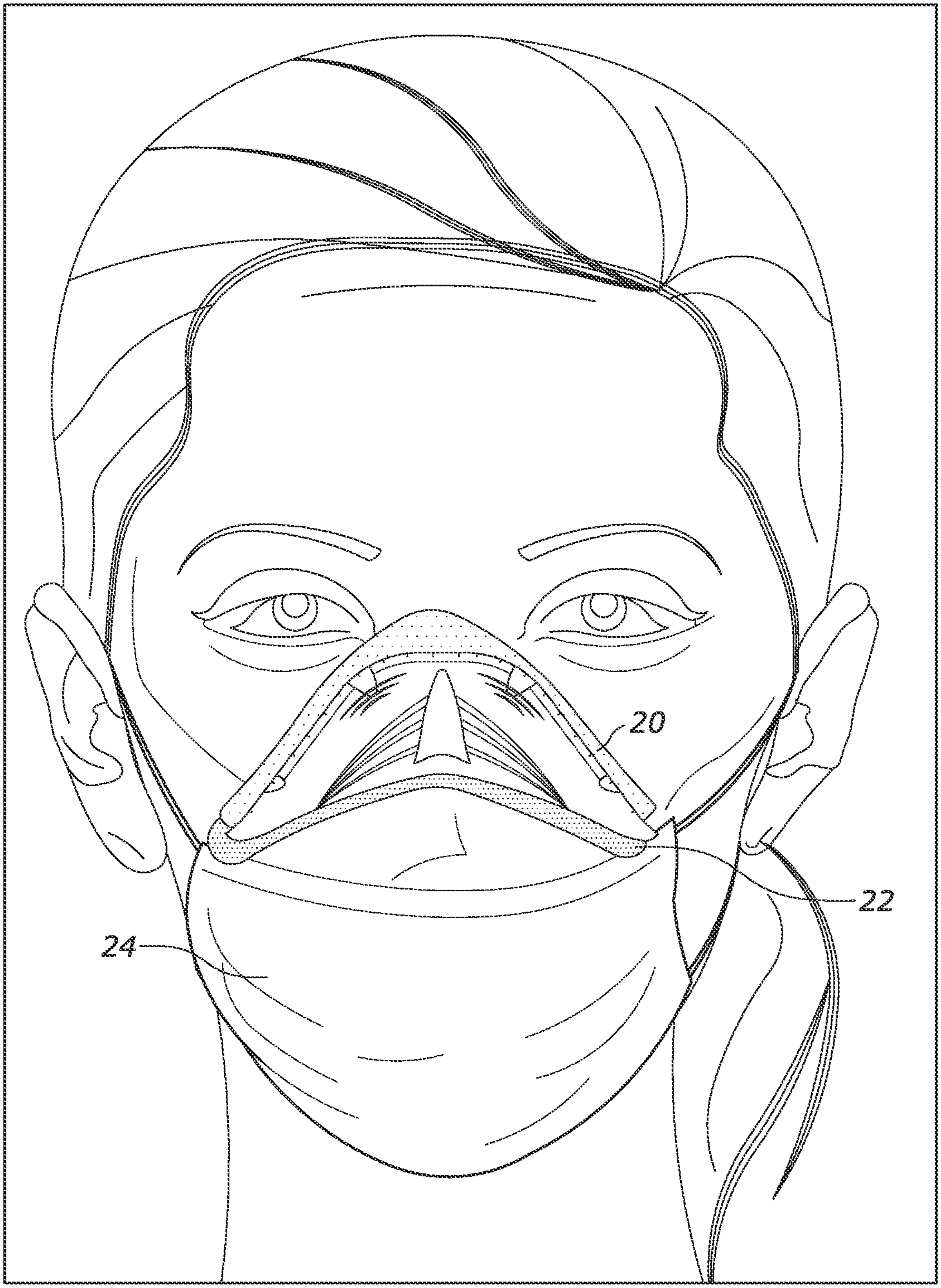
FIG. 3 is a schematic front view of a facial cover donned by a wearer according to an aspect of the present disclosure.
Figure 4:
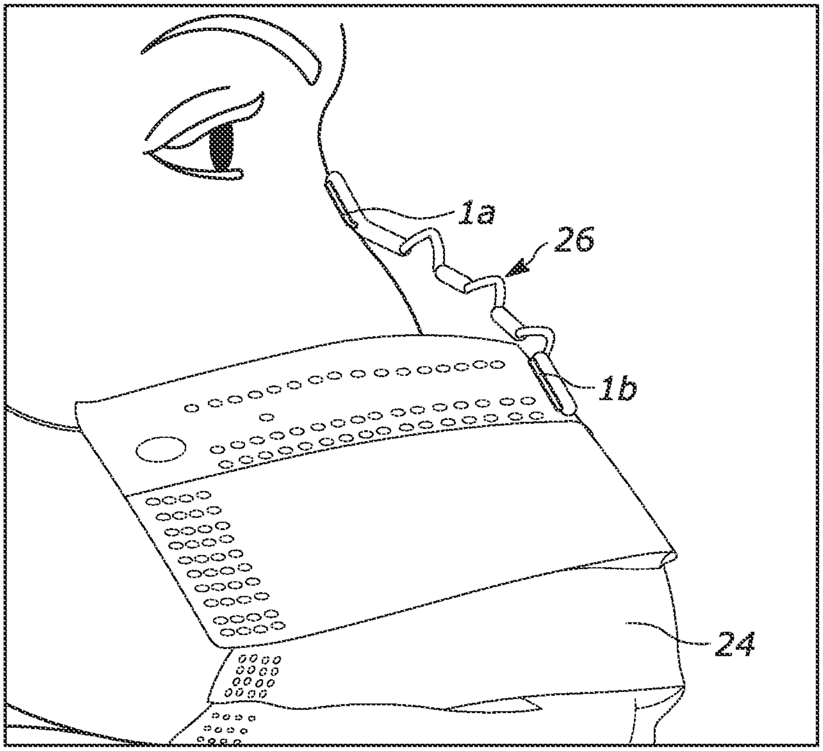
FIG. 4 is a side view of a facial cover donned by a wearer according to an aspect of the present disclosure.

Referring to FIGS. 3 and 4, in certain aspects, flexible tented facial cover 10 can be used with another mask 24. For example, the periphery (having hinged segments 26 as depicted in FIG. 4) can have an edge 1*a* that contact the wearer's skin and an edge 1*b* that contacts the mask. An adhesive 20 can be optionally attached to the periphery in order to attach the facial cover to the wearer's skin. An adhesive 22 can also be applied to the bottom portion of the cover or otherwise attached to the bottom portion of the cover.

Figure 5:
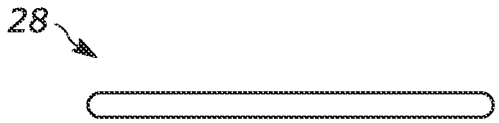
FIGS. 5-7 are side views illustrating the differences of thicknesses of a facial cover according to an aspect of the present disclosure.
Figure 6:
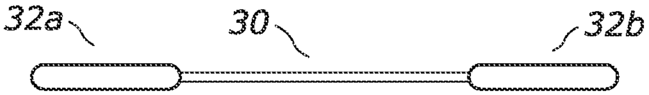
Figure 7:
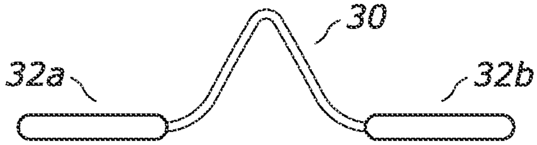

As stated above, certain parts of the face cover are thinner than the base layer. Such thinner segments permit lengthening and increase the surface area of the cover. This in turn increases flexibility of the cover allowing for dynamic expansion of the cover. For example, FIG. 5 illustrates a portion 28 of the base layer having a uniform thickness. FIG. 6 illustrates a thinned segment 30 of the cover that flanks a portion 32*a* and 32*b* of the base layer that thereby increasing of the length of the cover. As seen in FIG. 7, to accommodate the base layer within the same space as illustrated in FIG. 5, the thinned segment 30 as to form a "tent."

Figure 8:
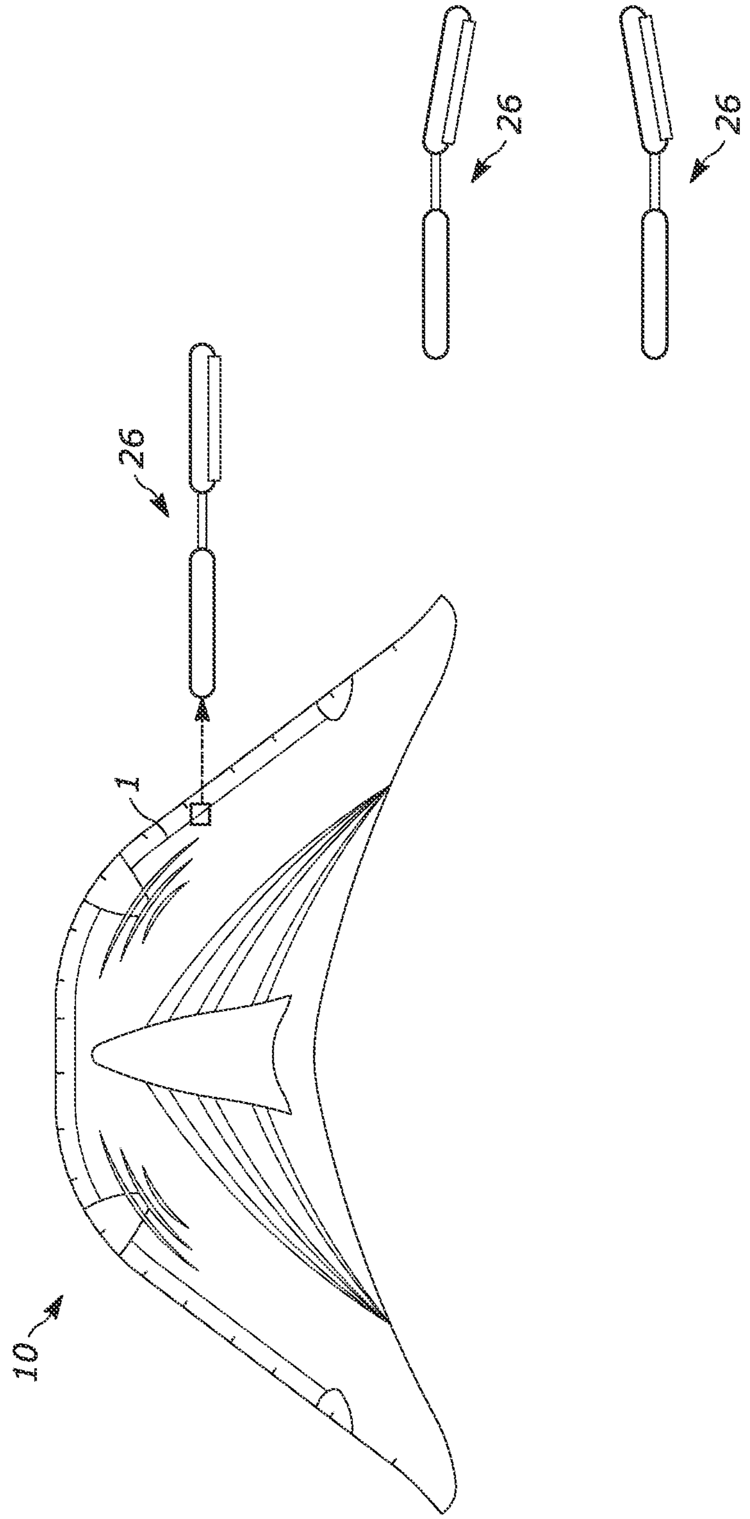
FIG. 8 is an internal view of a facial cover depicting hinges according to an aspect of the present disclosure.
Figure 9:
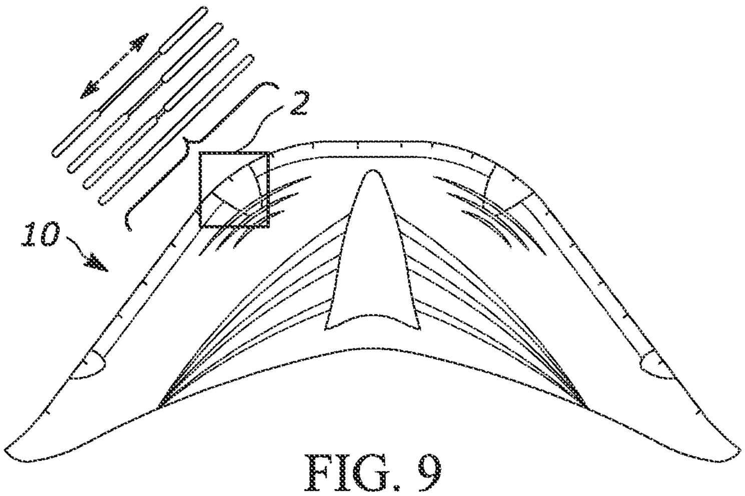
FIG. 9 is an internal view of a face cover depicting thinned portions around the top edge according to an aspect of the present disclosure.
Figure 10:
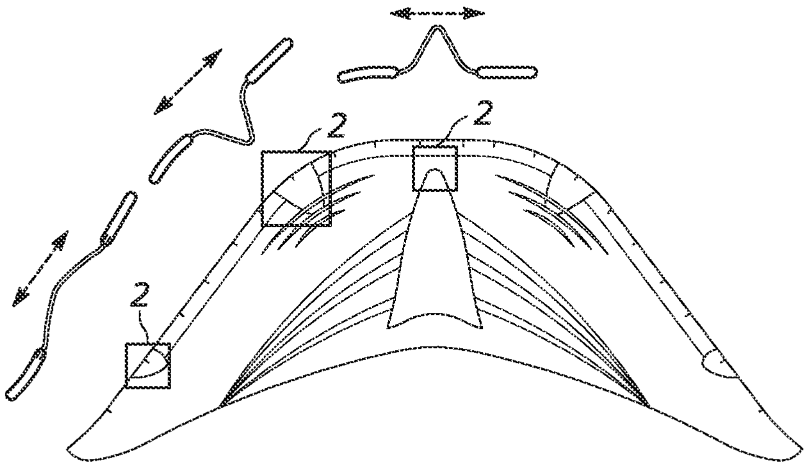
FIG. 10 is an internal view of a face cover depicting thinned portions around the top edge according to an aspect of the present disclosure.
Figure 11:
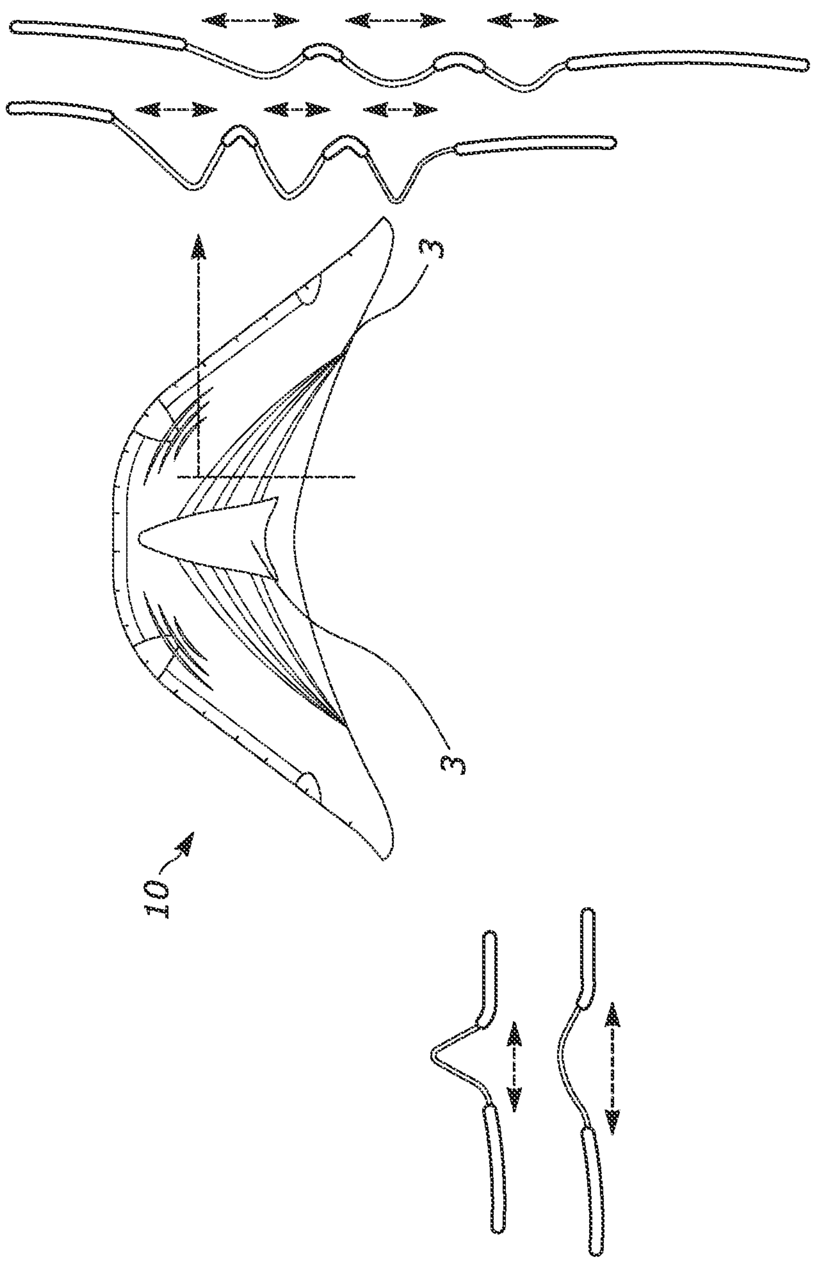
FIG. 11 is an internal view of a face cover depicting thinned portions according to an aspect of the present disclosure.
Figure 12:
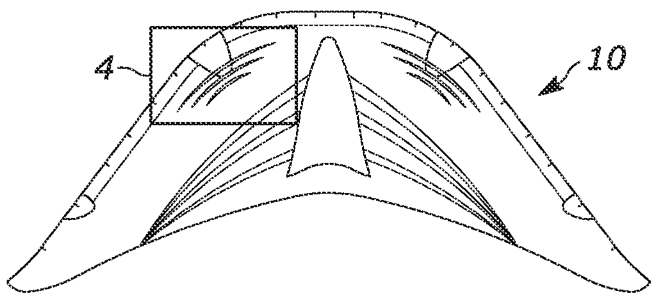
FIG. 12 is an internal view of a face cover depicting thinned portions according to an aspect of the present disclosure.
Figure 13:
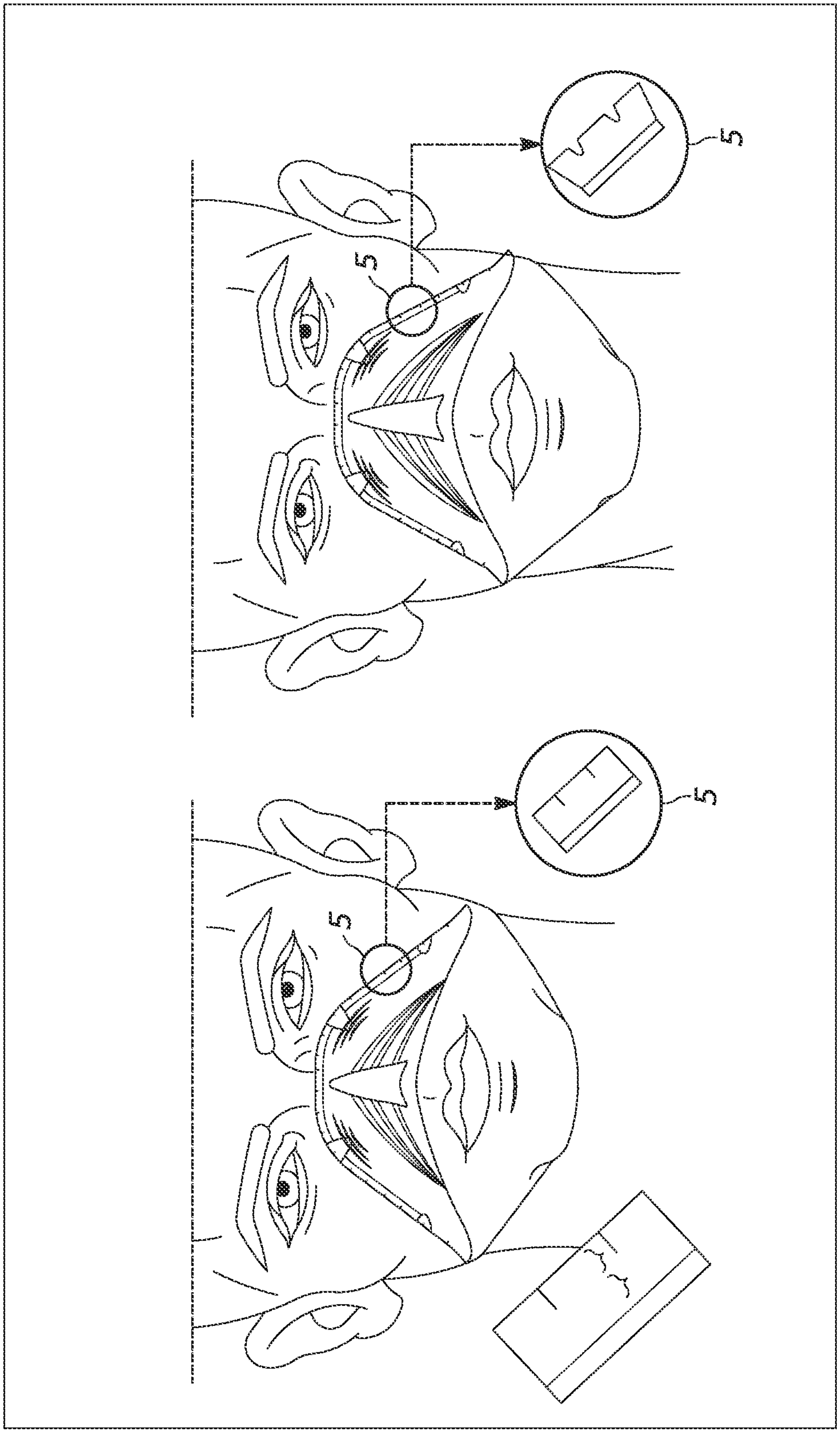
FIG. 13 is a front view of a face cover donned by a wearer depicting lengthening cuts according to an aspect of the present disclosure.
Figure 14:
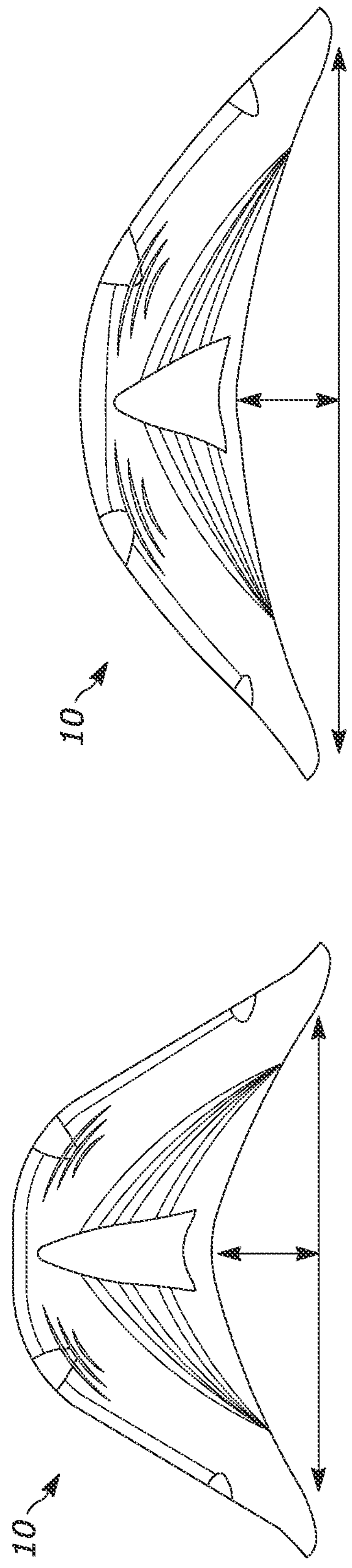
FIG. 14 is a front view of a face cover according to an aspect of the present disclosure.
Figure 15:
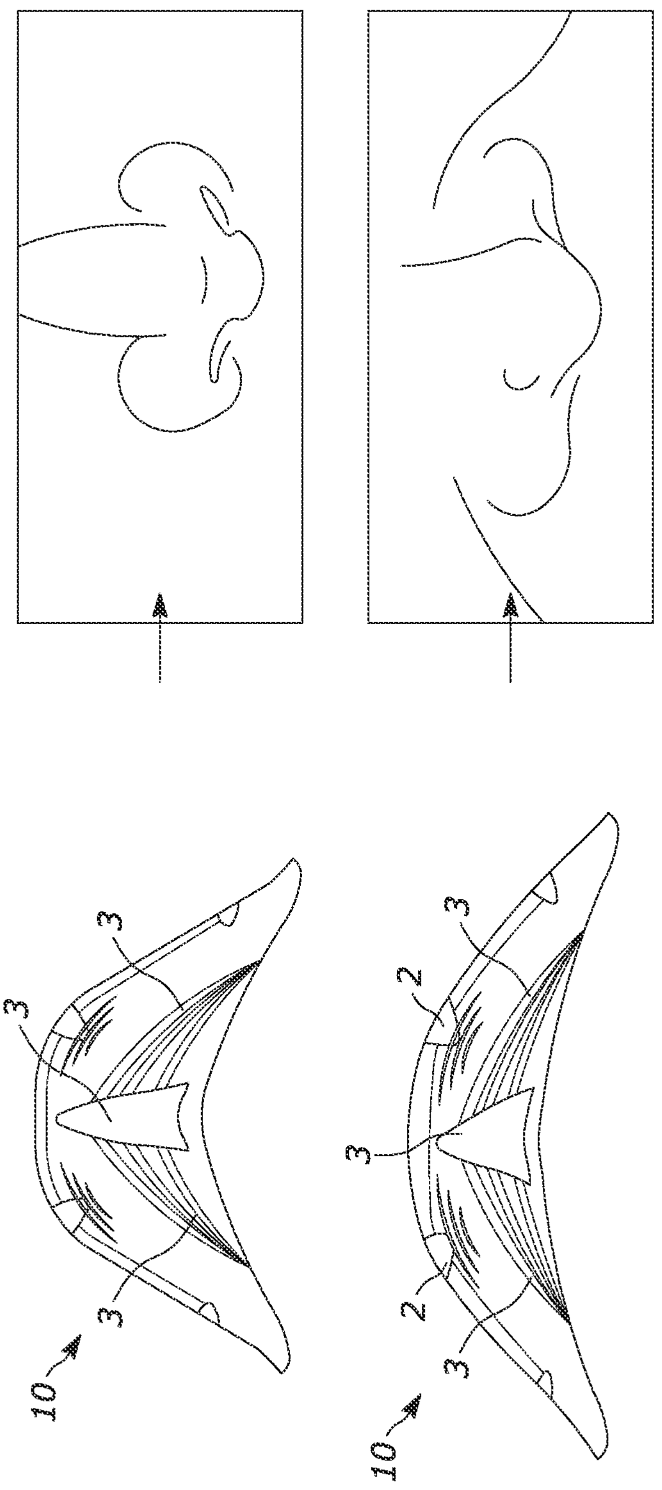
FIG. 15 depicts an internal view of a face cover demonstrating flexible zones adapting to different faces.
Figure 16:
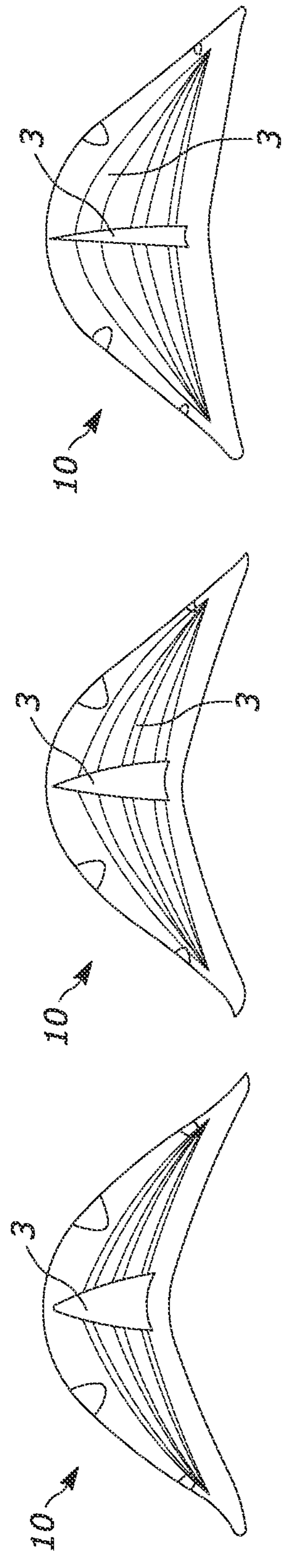
FIG. 16 depicts an internal view of a face cover demonstrating horizontal tents that can expand to bottom.
Figure 17:
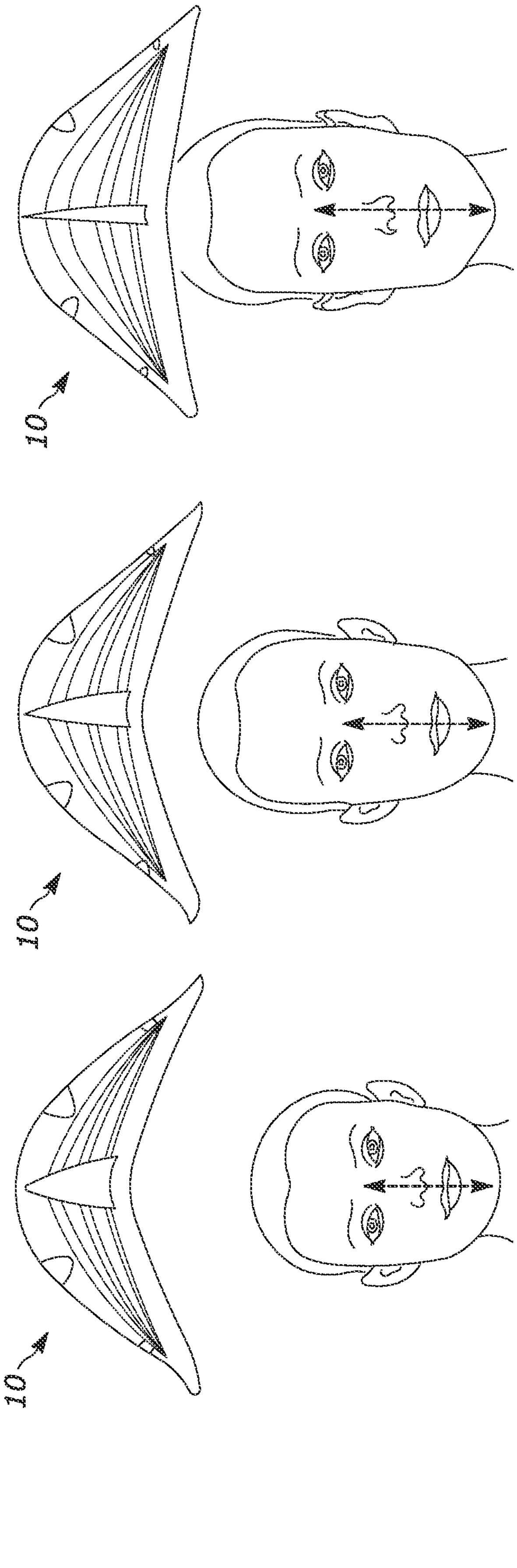
FIG. 17 depicts an internal view of a face cover demonstrating how tents can expand top to bottom and adapt to different people with varying facial lengths.
Figure 18:
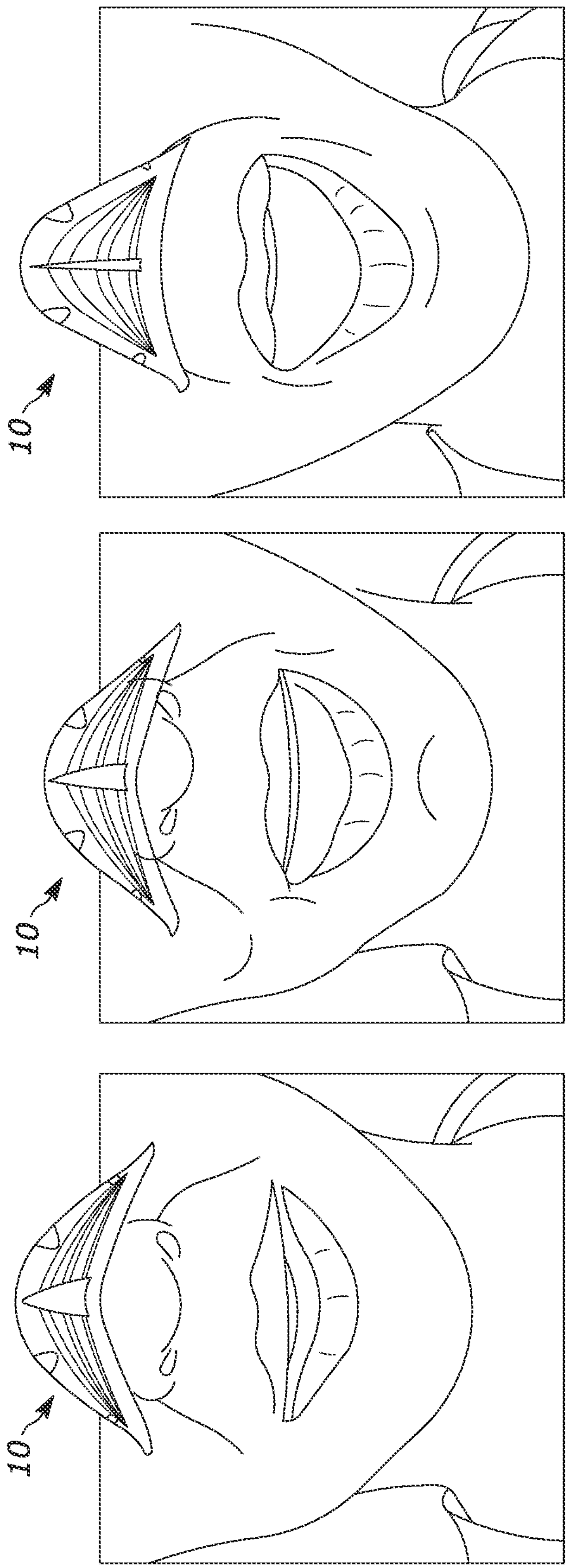
FIG. 18 depicts an internal view of a face cover demonstrating how tent expand top to bottom and adapt to facial movements in the same person.

With respect to individual components of the cover, several schematics illustrate the functionality of these components. For example, FIG. 8 illustrates the hinged segments 26 of periphery 1 that allow the skin edge of the device to easily flex to stay closer to the wearer's skin. FIGS. 9 and 10 illustrate component 2 of cover 10 that can be thinned out to make this component more flexible and allows edge lengthening to conform to the nose and cheek. FIG. 11 illustrates the cover tents 3 that can allow the cover to expand top to bottom and side to side. FIG. 12 illustrates the air reflectors 4 that are thinned compared to the base layer, which allows formation of internal folds to reflect air. The inner surfaces of these folds can be coated with a hydrophilic coating. Water vapor in the air that is breathed out by the wearer would expand the coated hydrophilic coating, which would in turn, increase the thickness of the fold and form an additional barrier of protection. FIG. 13 illustrates how lateral slits 5 lengthen with wearer face movement. Along the outer margin of the skin edge that is in contact with the skin, short thin cuts allow widening and thus increases the circumference of the skin edge. This allows the device skin edge to (a) adapt to narrower and broader shaped faces, (b) allow easy widening of the margin (while the rest of the skin edge stays in contact with skin) with facing movements. FIGS. 14-18 depict how the cover can accommodate for other wearer features such as having flexible zones adapted to different faces, horizontal cover tents that can expand top to bottom thereby adapting to wearers with varying facial lengths, and adapted to facial movements in the sane person.

Figure 19:
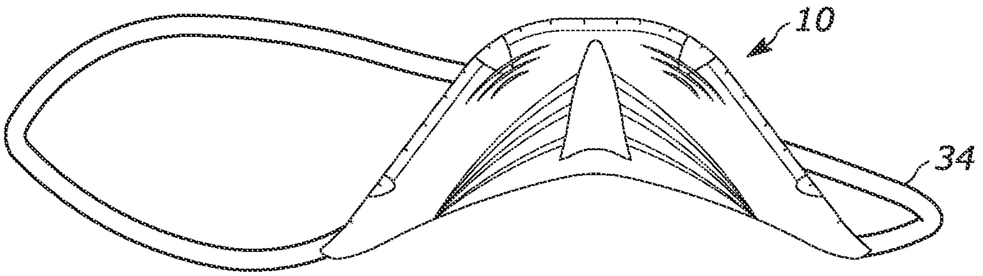
FIG. 19 is a perspective view of a face mask according to an aspect of the present disclosure.
Figure 20:
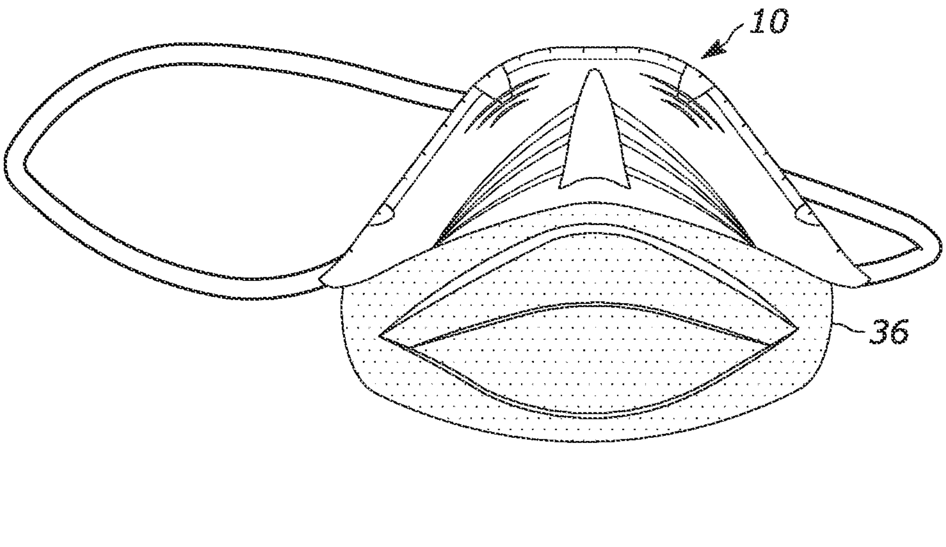
FIG. 20 is a perspective view of a face mask according to an aspect of the present disclosure.

The facial cover could include other features such a strap 34 as illustrated in FIG. 19 or an adhesive as previously described. It should be noted that any of the described embodiments could include a strap and/or adhesive to attach another component thereto. Alternatively and with reference to FIG. 20, cover 10 could including a hanging filter mask 36.

The cover could be impermeable but integrated with a filtering mask 36. For example, the filtering mask could be sealed to the cover by an adhesive.

Figure 21:
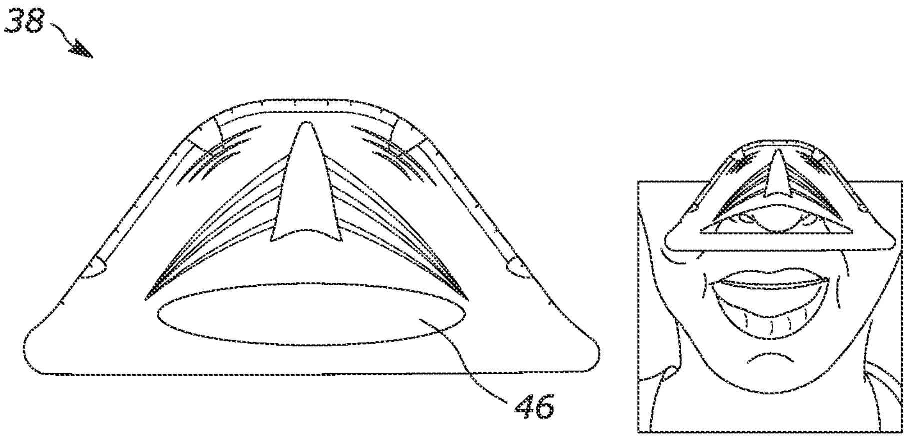
FIG. 21 is a perspective view of a face mask according to an aspect of the present disclosure.
Figure 22:
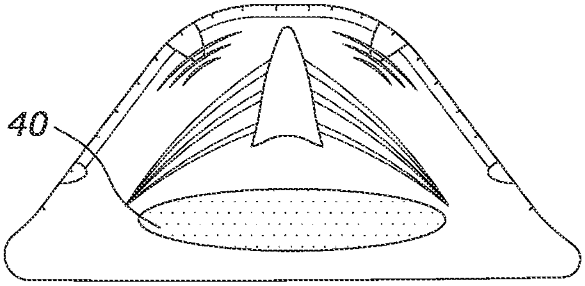
FIG. 22 is a front view of a face mask according to an aspect of the present disclosure.
Figure 23:
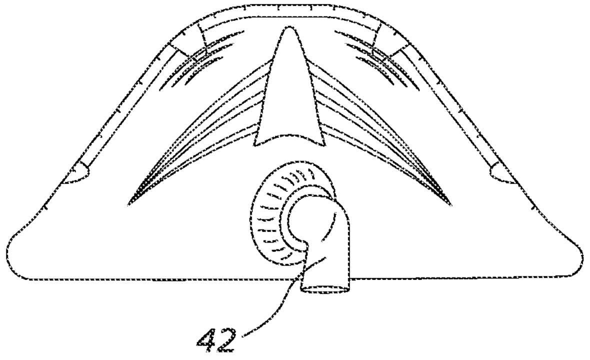
FIG. 23 is a front view of a face mask according to an aspect of the present disclosure.
Figure 24:
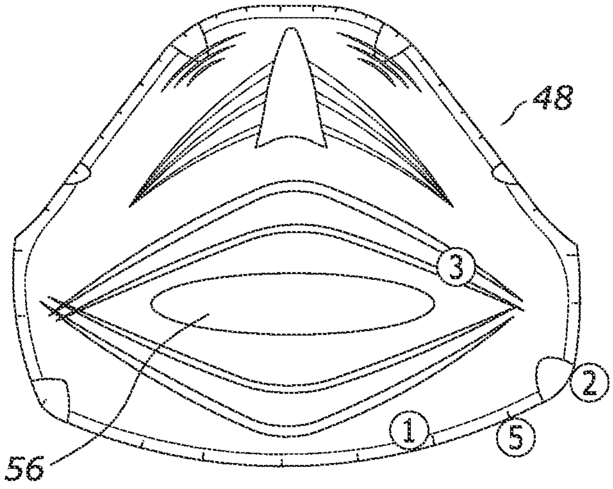
FIG. 24 is a front view of a face mask according to an aspect of the present disclosure.
Figure 25:
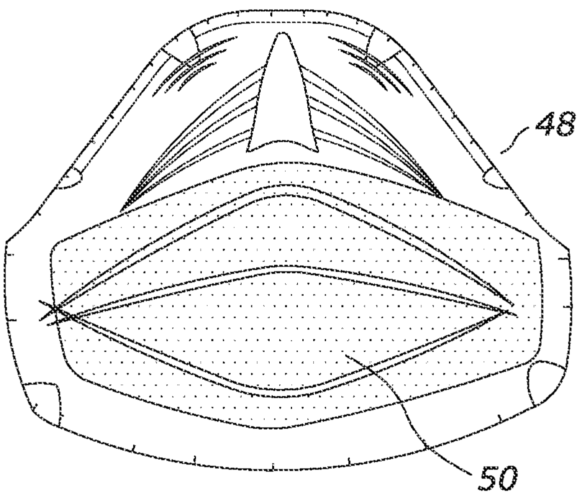
FIG. 25 is a front view of a face mask according to an aspect of the present disclosure.
Figure 26:
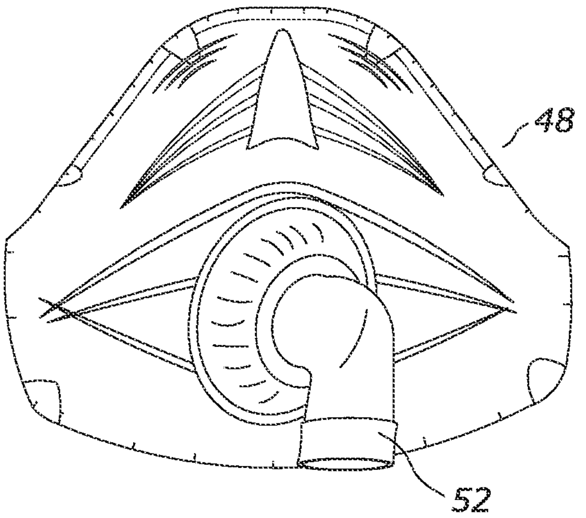
FIG. 26 is a front view of a face mask according to an aspect of the present disclosure.

Other variations are illustrated in FIGS. 21-23, a cover could include an orifice 46 within which a filtering material 40 is disposed (FIG. 22) or a nasal ventilation adaptor 42 (FIG. 23). With reference to FIGS. 24-26, the cover 48 could be a flexible tented nose-chin-mouth cover with a port 56. A filtering material 50 could be included in the port (FIG. 25) or a oral-nasal ventilation adapter 52 (FIG. 26).

Each of the disclosed aspects and embodiments of the present disclosure may be considered individually or in combination with other aspects, embodiments, and variations of the disclosure. Further, while certain features of embodiments and aspects of the present disclosure may be shown in only certain figures or otherwise described in the certain parts of the disclosure, such features can be incorporated into other embodiments and aspects shown in other figures or other parts of the disclosure. Along the same lines, certain features of embodiments and aspects of the present disclosure that are shown in certain figures or otherwise described in certain parts of the disclosure can be optional or deleted from such embodiments and aspects. Additionally, when describing a range, all points within that range are included in this disclosure. Further, unless otherwise specified, none of the steps of the methods of the present disclosure are confined to any particular order of performance. Furthermore, all references cited herein are incorporated by reference in their entirety.

What is claimed is:

1. A flexible tented facial cover having a top portion and a bottom portion and areas having different thicknesses, the facial cover comprising;

a base layer having a thickness;

a periphery comprising a plurality of hinged segments configured to permit deformation of at least the top portion while the periphery stays in substantial contact with wearer's skin;

a plurality of sections at an outer edge of at least the top portion having a thickness less than the thickness of the base layer that are configured to substantially conform to the contour around a nose and a cheek of a wearer, wherein the thickness less than the thickness of the base layer changes in width;

a plurality of cover tents configured to be disposed on the nose of the wearer and cheek portions adjacent to the nose allowing the facial cover to expand side to side and top to bottom, the plurality of cover tents each having a thickness less than the thickness of the base layer; and a plurality of air reflectors disposed on the cheek portions of the facial cover and configured to minimize air leakage around the nose.

2. The facial cover of claim 1, further comprising a plurality of slits located at the outer edge of at least the top portion, the plurality of slits allowing widening of the facial cover during use.

3. The facial cover of claim 1, wherein the plurality of hinged segments comprises segments having alternating thicknesses such that one segment has a greater thickness than an immediately adjacent segment.

4. The facial cover of claim 1, wherein the plurality of hinged segments alternate between a segment having a first thickness and a segment having a second thickness, the first thickness being greater than the second thickness.

5. The facial cover of claim 1, further comprising a mask comprising a filtering material attached to opposing edges of the periphery and the bottom portion, the mask configured to cover a mouth of the wearer.

6. The facial cover of claim 1, wherein the plurality of air reflectors comprises folds configured to reflect air, the inner surfaces of the folds coated with a hydrophilic material.

7. The facial cover of claim 1, further comprising a strap attached to the base layer.

8. The facial cover of claim 1, further comprising an orifice located below the cover tent of the plurality of cover tents that is configured to be disposed on the nose of the wearer.

9. The facial cover of claim 8, further comprising a filtering material disposed within the orifice.

10. The facial cover of claim 8, further comprising a nasal ventilation adapter having an end disposed in the orifice.

11. The facial cover of claim 1, wherein the bottom portion is configured to cover mouth and chin of the wearer.

12. The facial cover of claim 11, further comprising an orifice located below the cover tent of the plurality of cover tents that is configured to be disposed on the nose of the wearer and above the bottom portion.

13. The facial cover of claim 12, further comprising a filtering material disposed within the orifice.

14. The facial cover of claim 12, further comprising a nasal ventilation adapter having an end disposed in the orifice.

* * * * *